United States Patent [19]
Kawate et al.

[11] Patent Number: 5,051,937
[45] Date of Patent: * Sep. 24, 1991

[54] LOW COST HIGH PRECISION SENSOR

[75] Inventors: Keith W. Kawate, Attleboro Falls, Mass.; Anthony J. Sabetti, Greenville, R.I.

[73] Assignee: Texas Instruments Incorporated, Dallas, Tex.

[*] Notice: The portion of the term of this patent subsequent to Jan. 1, 2008 has been disclaimed.

[21] Appl. No.: 621,000

[22] Filed: Dec. 3, 1990

Related U.S. Application Data

[63] Continuation of Ser. No. 432,024, Nov. 6, 1989, Pat. No. 4,982,351, which is a continuation of Ser. No. 859,561, May 5, 1986, abandoned.

[51] Int. Cl.$^5$ ............... G06F 15/20; G01L 9/12
[52] U.S. Cl. ............... 364/571.01; 364/550; 364/558; 73/718; 73/724; 361/283
[58] Field of Search ........... 364/571.01, 550, 558, 364/557; 73/780, 718, 708, 724; 361/283

[56] References Cited

U.S. PATENT DOCUMENTS

| | | | |
|---|---|---|---|
| 2,539,892 | 1/1951 | Cook | 73/718 |
| 2,857,495 | 10/1958 | Bourns et al. | 361/283 |
| 2,867,706 | 1/1959 | Statham | 361/283 |
| 2,966,668 | 12/1960 | Hillman et al. | 361/283 |
| 2,969,514 | 1/1961 | Curtis | 73/718 |
| 2,999,385 | 9/1961 | Wolfe | 73/718 |
| 3,036,526 | 5/1962 | Hise | 324/99 C |
| 3,047,022 | 7/1962 | Aldinger | 73/718 |

(List continued on next page.)

FOREIGN PATENT DOCUMENTS

| | | |
|---|---|---|
| 2021479 | 5/1970 | Fed. Rep. of Germany . |
| 1367935 | 5/1971 | United Kingdom . |
| 2059071 | 4/1981 | United Kingdom . |

OTHER PUBLICATIONS

J. Landard et al.—A Sensitive Nonmagnetic Transducer for Use at Very Low Temperature—Vol. 41, No. 1—Mar. 1970—The Review of Scientific Instruments.
Dean R. Harrison et al.—A Two-Wire IC Compatible Capacitive Transducer Circuit—Vol. 41; No. 12—Nov. 1970—The Review of Scientific Instruments.
Publication: Automotive Electronics In A Fast Changing World; Electro/81 Professional Program Session Record; Mohammed Faheem Akram, 1981.

Primary Examiner—Parshotam S. Lall
Assistant Examiner—Ellis B. Ramirez
Attorney, Agent, or Firm—James P. McAndrews; John A. Haug; Melvin Sharp

[57] ABSTRACT

A universal sensor has a selectivity scaled condition responsive element such as a capacitive pressure transducer mounted on a common support with signal conditioning means embodied in an integrated circuit to provide a control signal precisely corresponding to a sensed condition. Electrically actuatable means on the support are incorporated in the circuit for low cost, mass producible calibration of the circuit and condition-responsive element relative to each other after assembly on the common support. Preferably, a capacitive pressure transducer and a reference capacitor are arranged in a charge-locked loop relation with a common node while an array of switches cycles the voltage across teh transducer and reference capacitors with opposite transitions with a predetermined frequency so change in transducer capacitance results in a differential voltage at the common node. That voltage is amplified to drive a current source-sink-integrate network and adjust sensor output voltage to restore a balanced condition at the common node and maintain sensor output voltage at a level inversely proportional to transducer capacitance. The sensor is adapted for calibration to provide an electrical calibration signal for actuating calibration means such as electrically settable potentiometers, or serially programmed digital-to-analog converters or the like to provide bias and gain and non-linearity calibration in the sensor. In one embodiment, calibration is achieved by adjustment of variable capacitors.

1 Claim, 4 Drawing Sheets

U.S. PATENT DOCUMENTS

| | | | |
|---|---|---|---|
| 3,091,123 | 5/1963 | Locke | 73/718 |
| 3,094,876 | 6/1963 | Hastings | 73/718 |
| 3,096,656 | 7/1963 | Jackson | 73/718 |
| 3,117,550 | 1/1964 | Cole | 73/718 |
| 3,124,959 | 3/1964 | Pall et al. | 73/785 |
| 3,125,062 | 3/1964 | Raupp | 361/283 |
| 3,128,743 | 4/1964 | Whiting | 361/283 |
| 3,158,000 | 11/1964 | Aldinger | 324/57 R |
| 3,158,001 | 11/1964 | Baner et al. | 324/99 C |
| 3,183,793 | 5/1965 | McCleery | 361/283 |
| 3,215,951 | 11/1965 | Anderson et al. | 73/718 |
| 3,235,790 | 2/1966 | Collins | 73/718 |
| 3,239,778 | 3/1966 | Rywak | 73/718 |
| 3,261,669 | 9/1966 | Lode | 73/718 |
| 3,262,317 | 7/1966 | Smith | 73/718 |
| 3,290,945 | 12/1966 | Yao Tzu Li et al. | 73/718 |
| 3,304,779 | 2/1967 | Reed | 73/718 |
| 3,313,158 | 4/1967 | Giovanni | 73/724 |
| 3,318,153 | 5/1967 | Lode | 73/724 |
| 3,319,185 | 5/1967 | Anderson et al. | 73/724 |
| 3,321,956 | 5/1967 | Olliver | 73/724 |
| 3,342,072 | 9/1967 | Trekell | 73/724 |
| 3,343,420 | 9/1967 | Kondo et al. | 73/724 |
| 3,352,157 | 11/1967 | Seegmiller | 324/57 R |
| 3,372,594 | 3/1968 | Bristol | 361/283 |
| 3,397,319 | 8/1968 | Locke | 361/283 |
| 3,405,559 | 10/1968 | Moffatt | 324/57 R |
| 3,444,736 | 5/1969 | Stedman | 324/99 C |
| 3,503,116 | 3/1970 | Strack | 73/724 |
| 3,562,641 | 2/1971 | Falks et al. | 324/57 R |
| 3,618,390 | 11/1971 | Frick | 73/724 |
| 3,645,137 | 2/1972 | Hazen | 361/283 |
| 3,646,538 | 2/1972 | Frick | 361/283 |
| 3,698,248 | 10/1972 | Vasek | 361/283 |
| 3,703,828 | 11/1973 | Bullard et al. | 73/718 |
| 3,715,638 | 2/1973 | Poyle | 361/283 |
| 3,725,638 | 2/1973 | Poyle | 324/57 R |
| 3,748,571 | 7/1973 | Kurtz | 73/724 |
| 3,750,476 | 8/1973 | Brown | 324/99 C |
| 3,800,750 | 4/1974 | Reddy | 361/283 |
| 3,821,659 | 6/1974 | Ludwig | 361/283 |
| 3,848,180 | 11/1974 | Jonke | 73/724 |
| 3,858,097 | 12/1974 | Poyle | 361/283 |
| 3,880,009 | 4/1974 | Johnston | 73/724 |
| 3,943,915 | 3/1976 | Severson | 73/724 |
| 3,952,234 | 4/1976 | Birchall | 73/724 |
| 4,054,833 | 10/1977 | Briefer | 324/60 C |
| 4,151,578 | 4/1979 | Bell | 73/718 |
| 4,158,217 | 6/1979 | Bell | 73/718 |
| 4,177,496 | 12/1979 | Bell et al. | 361/283 |
| 4,207,604 | 6/1980 | Bell | 361/283 |
| 4,322,977 | 4/1982 | Sell et al. | 324/60 C |
| 4,329,732 | 5/1982 | Kavli et al. | 73/718 |
| 4,388,668 | 6/1983 | Bell et al. | 361/283 |
| 4,389,895 | 6/1983 | Rud | 73/718 |
| 4,398,426 | 8/1983 | Park et al. | 361/283 |
| 4,425,799 | 1/1984 | Park | 73/718 |
| 4,426,673 | 1/1984 | Bell et al. | 361/283 |
| 4,434,665 | 3/1984 | Adolfson et al. | 73/724 |
| 4,449,409 | 5/1984 | Antonazzi | 73/718 |
| 4,457,179 | 7/1984 | Antonazzi et al. | 73/718 |
| 4,517,611 | 5/1985 | Mole | 73/718 |
| 4,544,875 | 10/1985 | Park et al. | 73/724 |
| 4,550,611 | 11/1985 | Gainocki | 73/718 |
| 4,617,606 | 10/1986 | Shak et al. | 73/718 |
| 4,617,607 | 10/1986 | Park et al. | 361/283 |
| 4,625,560 | 12/1986 | Sanders | 73/718 |
| 4,680,971 | 7/1987 | Kavli et al. | 73/718 |
| 4,735,098 | 4/1988 | Kavli et al. | 73/718 |

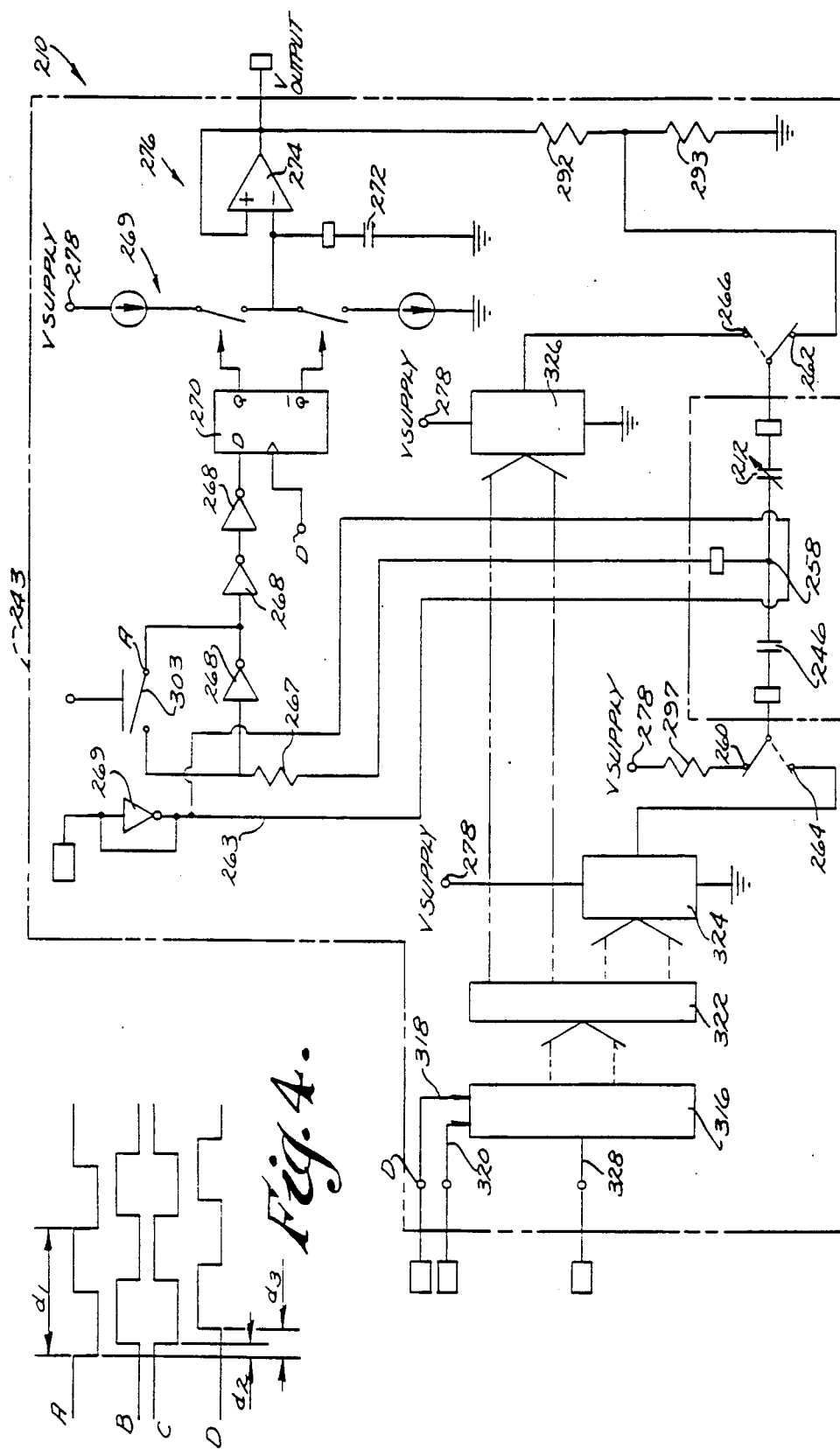

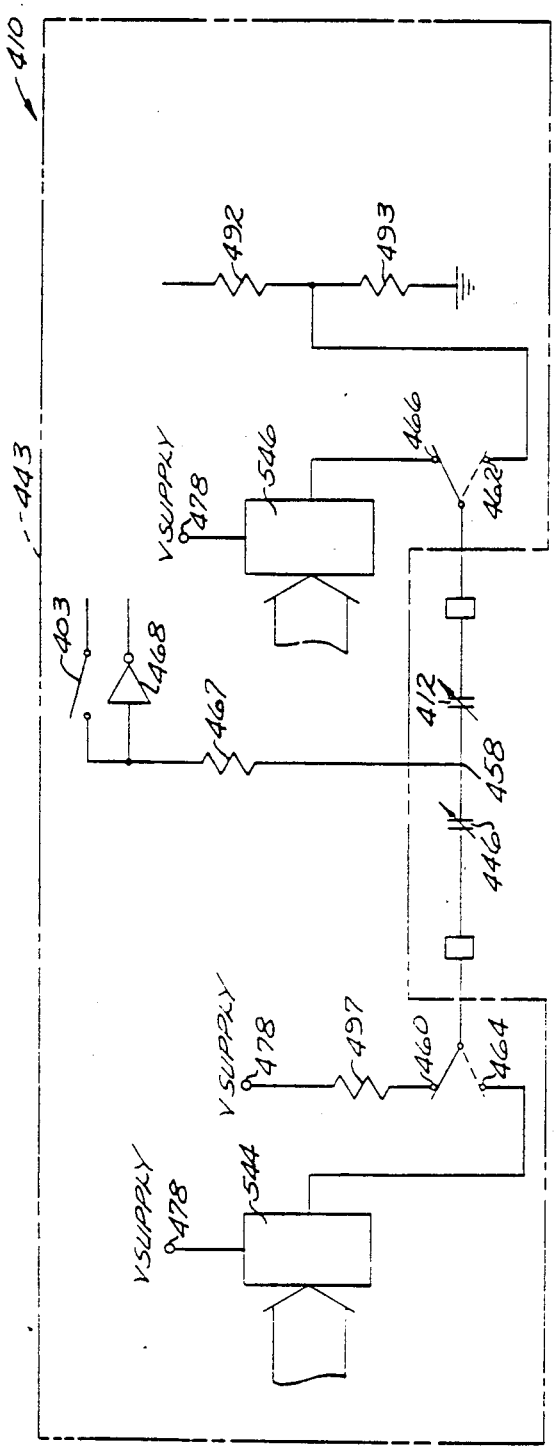
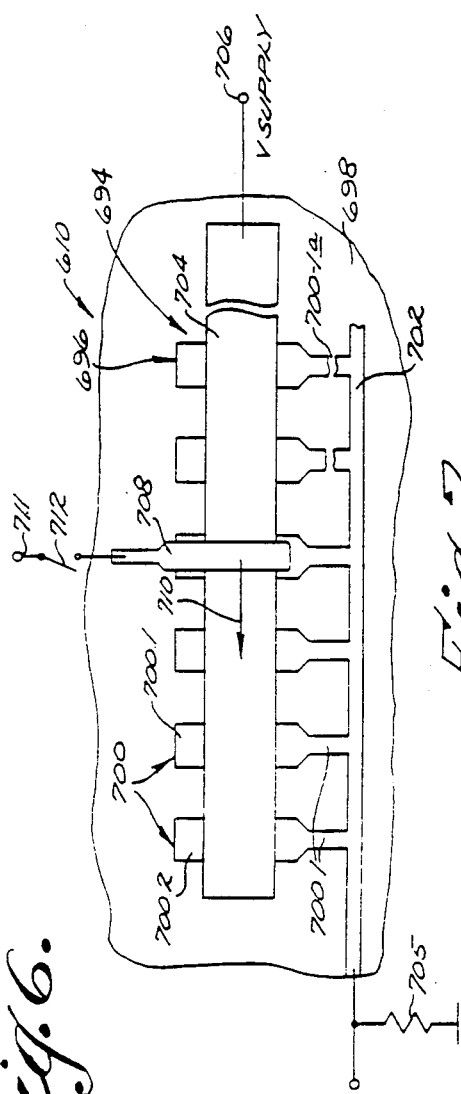
Fig. 6.
Fig. 7.

LOW COST HIGH PRECISION SENSOR

This application is a continuation, of application Ser. No. 07/432,024, filed 11-06-89 now U.S. Pat. No. 4982351. which was a continuation of Ser. No. 06/859,561, filed 5-5-86 now abandoned.

BACKGROUND OF THE INVENTION

The field of this invention is that of condition responsive sensors and the invention relates more particularly to sensors which provide high precision but which are adapted to be manufactured at low cost for wide application in severe environments in automotive vehicles or the like to have long, reliable service lives in such environments.

The widest possible use of computers for performing highly sophisticated control functions has sometimes been retarded by the lack of availability of suitable sensors capable of furnishing correspondingly sophisticated and reliable control input to the computers. Sensors which have been available have tended to be relatively expensive to manufacture or to provide less than fully desirable levels of precision and reliability over suitably long service lives for many purposes. This is particularly true where such sensors have been considered for use in automotive applications and the like where the sensors might be subjected to severe environmental conditions.

BRIEF SUMMARY OF THE INVENTION

It has now been recognized that many problems of sensor cost, precision and reliability are overcome where particular sensor structures are adapted in certain ways for more universal application such that the wider application permits incorporation of more sophisticated sensor features to enhance precision and reliability while also permitting manufacturing economy resulting from the larger volume manufacture made possible by wider application to maintain sensor costs at practical levels. It is further recognized that even wider application is achieved where the sensor incorporates a condition responsive element such as a capacitive pressure transducer which is easily scaled to provide initial condition-responsive signals within the same general range for respective different ranges of applied pressure or other condition being monitored; where the sensor incorporates a low cost integrated circuit adapted for providing amplification or other desired conditioning of such initial, condition-responsive signals which are within said general range; where the sensor incorporates calibration means which are electrically actuatable to permit reliable, low cost calibration of each condition-responsive element with its integrated circuit after the element, circuit, and calibration means have been assembled on a common sensor support or housing; and where the condition-responsive element and circuit incorporated in the sensor have sufficiently low temperature sensitivity and sufficiently wide temperature and service life stability to cooperate with the scaleability of the condition-responsive element and with the low cost calibration of the sensor circuit to provide the sensor with widely applicable performance capabilities.

It is an object of this invention to provide a novel and improved condition-responsive sensor; to provide such a sensor which is adapted for more universal application; to provide such a sensor having a condition responsive element to furnish an initial electrical signal and having a signal-conditioning integrated circuit mounted on a common support and having electrically actuatable means mounted on the support for calibrating the element and circuit relative to each other after assembly on the support; to provide such a condition responsive element which is scalable for providing initial condition responsive signals within the same general range for various selected ranges of applied pressure or other condition being monitored; to provide a novel and improved pressure or position sensor having a capacitive pressure transducer and a reference capacitor connected in a charge-locked loop relation to form a capacitance-to-voltage converter circuit which delivers improved accuracy and has improved responsiveness to small changes in transducer capacitance; to provide such a sensor having an integrated circuit with electrically actuatable on-chip means for calibrating the circuit relative to a capacitive transducer or other condition responsive element after assembly of the element and circuit on a common support or housing; to provide such a sensor having means for separately calibrating sensor bias and gain and non-linearity; and to provide such a sensor employing variable capacitor means for calibrating bias and gain with improved temperature and service life stability.

Briefly described, the novel and improved condition responsive sensor of this invention comprises a selectively scaled condition responsive element such as a capacitive pressure transducer which is mounted on a common support or housing with an analog signal conditioning circuit or the like, preferably embodied in an integrated circuit implemented in CMOS technology or the like. In a preferred embodiment, the condition-responsive element comprises a capacitive pressure transducer having a pressure responsive diaphragm for varying transducer capacitance within a selected range in response to variation in pressure forces applied to the diaphragm and the diaphragm structure is such that its thickness is easily modified to provide the diaphragm with any of a plurality of selected different resilient flexibilities to scale the transducer to vary transducer capacitance within said selected range in response to various ranges of pressure applied to the respective diaphragm thicknesses. In accordance with the invention, the sensor includes calibrating means which are provided on the common support with the condition-responsive element and the integrated circuit and which preferably are electrically actuatable on the support for calibrating the condition-responsive element and sensor circuit relative to each other after they have been assembled on the common support or housing. In one preferred embodiment, the calibrating means comprise separately settable potentiometers for calibrating sensor bias and gain where the potentiometers are adapted to be adjustably set for calibrating the sensor and to be fixed at that setting. In another preferred embodiment, the integrated circuit incorporates two digital-to-analog (D/A) converters attached to a serial-in, parallel-out shift register which can be loaded via data and clock input means during calibration of the sensor and permanently fixed in memory means by fusing of links or floating gate means in associated integrated circuit switches so that each D/A converter receives one-half the data in the register for regulating bias and gain calibration respectively.

In one preferred embodiment of the invention, a capacitive pressure transducer and a reference capacitor are connected in a charge-locked loop relation having a common node for forming a capacitance-to-voltage converter circuit which is ratiometric with respect to supply voltage to vary output voltage within a selected range in response to variation in transducer capacitance in a corresponding range. An array of switches cycles the voltage across the transducer and reference capacitors with opposite transitions with a predetermined frequency so that change in transducer capacitance results in a differential voltage at the common node. That voltage is then amplified or otherwise conditioned to drive a current source-sink network to adjust the sensor output voltage and, by a feedback path, to restore a balance condition at the node, thereby to maintain the sensor output voltage at a level inversely proportional to the transducer capacitance.

In another preferred embodiment, a capacitive pressure transducer and a selectively variable capacitor are arranged with a common node such that the transducer capacitor and variable capacitor form a charge-locked loop detector with respect to the same common node. An array of switches then cycles the voltage across the capacitors between voltages dependent upon the supply voltage and output voltage in accordance with a variation in transducer capacitance in a manner corresponding to other embodiments of the invention as described above. In that arrangement, the variable capacitor is adjustable or electrically actuatable with data stored via fusable links or floating gates as described above for calibrating the sensor.

DESCRIPTION OF THE DRAWINGS

Other objects, advantages and details of the novel and improved condition-responsive sensor of this invention appear in the following detailed description of preferred embodiments of the invention, the detailed description referring to the drawings in which:

FIG. 4 is a wave diagram illustrating operation of the circuit shown in FIG. 3;

FIG. 5 is a schematic view of another analog signal conditioning circuit embodied in another alternate preferred embodiment of this invention;

FIG. 6 is a schematic view of another signal-conditioning circuit embodied in another alternate preferred embodiment of the invention; and FIG. 7 is a plan view of an electrically actuatable calibration means used in one preferred embodiment of the sensor of this invention.

DESCRIPTION OF THE PREFERRED EMBODIMENTS

Figure 1:
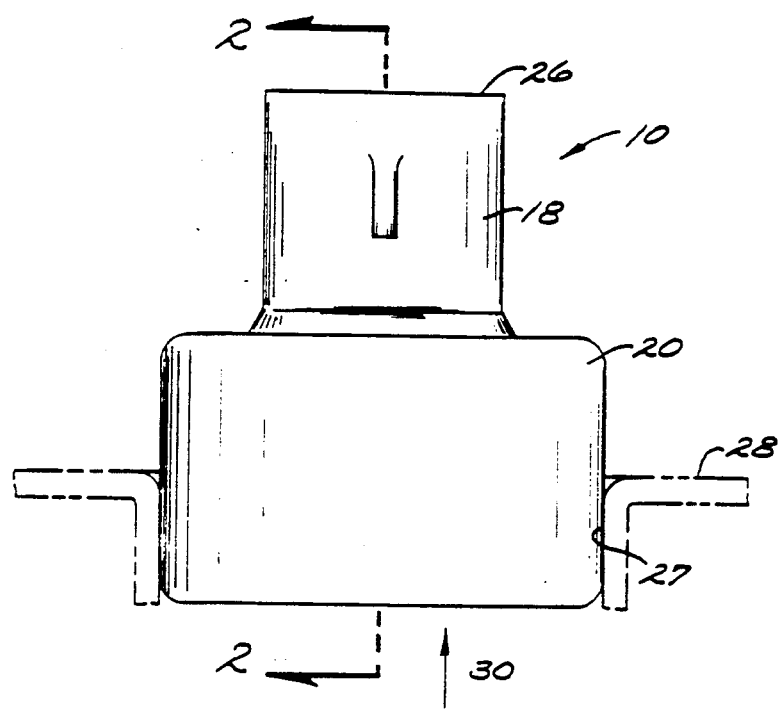
FIG. 1 is a front elevation view of a condition-responsive sensor of this invention.
Figure 2:
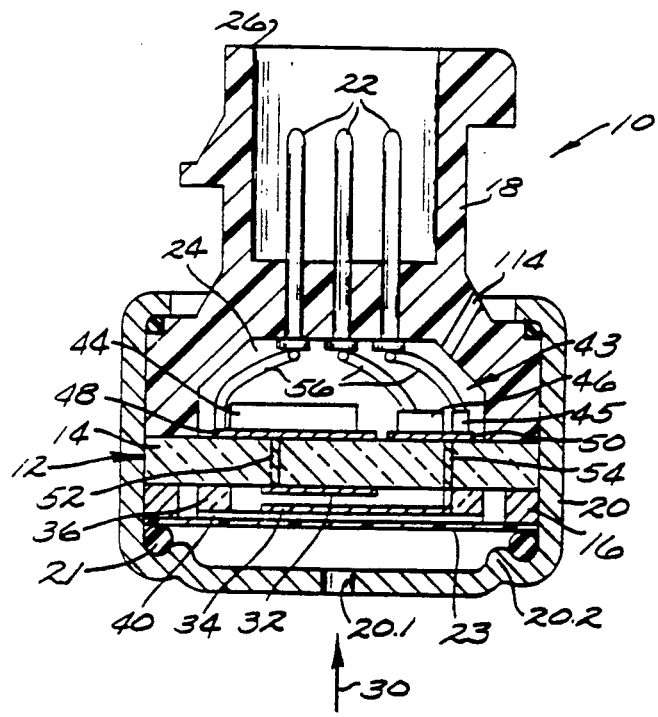
FIG. 2 is a section view along line 2—'of FIG. 1.

Referring to the drawings, 10 in FIGS. 1 and 2 indicates the novel and improved condition-responsive sensor of this invention which is shown to include a condition-responsive element such as a capacitive pressure transducer 12 having a ceramic substrate 14. The transducer is preferably fitted against one side of an annular supporting portion of a sensor body 18 of a thermoplastic material or the like and has a metal support ring 16 secured to an opposite side of the transducer periphery by a cup-shaped metal cap 20 which is swaged over a peripheral portion of the transducer, an O-ring gasket 21, a pliable teflon-coated polymide film 23, the ring 16, and a portion of the body to form a sensor housing for support assembly. The cap is preferably formed inwardly as at 20.2, for compressing and positioning the O-ring gasket over the pliable film 23 to real the sensor. Preferably three electrically conductive terminals 22 are molded into the body extending from the body chamber 24 into a protective sleeve 26 to permit electrical connection to be made to the terminals from outside the body. The cap 20 is adapted to fit into an opening 27 in a well 28 for permitting the sensor to be exposed to a fluid pressure in the well as indicated by the arrow 30 in FIG. 1, the cap having an opening 20.1 exposing the transducer 12 to that fluid pressure while permitting the gasket 21 and film 23 to seal the sensor electronics from the pressure.

In a preferred embodiment, the transducer 12 has a first electrically conductive metal capacitor plate 32 formed on one side of the substrate 14 and has a corresponding metal plate 34 carried on a resiliently flexible diaphragm 40. The diaphragm is secured to a portion of the substrate 14 spaced inwardly from the periphery of the substrate by use of glass seal means 36 for disposing the metal plate 34 in spaced, parallel, overlying relation to the first capacitor plate to serve as a second movable capacitor plate. The second capacitor plate is movable toward and away from the first capacitor plate in response to variation of the pressure force 30 applied to the diaphragm so that the transducer 12 comprises a variable capacitor having a capacitance which varies with changes in the pressure condition in the well 28.

In a preferred embodiment, signal-conditioning means 43 such as electronic circuit means embodied in an integrated circuit 44, resistor means diagrammatically illustrated in FIG. 2 at 45, and a reference capacitor diagrammatically illustrated at 46 in FIG. 2 are mounted on an opposite side of the substrate 14 and circuit paths diagrammatically illustrated at 48, 50 conneted to the integrated circuit, resistor means, and reference capacitor are connected to transducer capacitor plates by pins 52, 54. The signal-conditioning means are also connected to the sensor terminals 22 either directly or by lead wires or the like as diagrammatically shown in FIG. 2. In that arrangement, the transducer 12 is adapted to provide an initial electrical signal such as change in capacitance in the transducer in response to change in the pressure condition 30 and the signal-conditioning means are adapted to amplify, convert and/or otherwise condition the initial electrical signal to provide an electrical output signal at the terminals 22 for performing a desired control function as will be understood.

In accordance with the invention, the condition-responsive element such as the capacitive transducer 12 is selected to provide said initial electrical signal within a first general signal range in response to changes in the pressure or other condition being monitored while those conditions vary over a second general pressure range. For example, in a preferred embodiment, the first and second capacitor plates in the transducer 12 have a diameter of about 0.5 inches and an initial spacing of about 0.001 inches and the diaphragm 40 has a selected thickness permitting the transducer capacitor to vary in capacitance from about 30 to 60 picofarads as the applied pressure varies from about 0 to 450 psi. However, the condition-responsive structure is particularly selected to be easily scalable so that the element is adapted to provide the initial electrical signals varying in the same first range even though the element is scaled to respond to variation of the monitored conditions over a variety of second ranges. In the transducer 12 for example, the thickness of the diaphragm 40 is easily scaled to provide change in capacitance over the same range for many different ranges of the pressure 30. In that way, the same signal-conditioning means incorporated in the sensor is adapted to be used in sensing a wide variety of conditions being monitored by substitution of a specific pressure transducer so that the signal-conditioning means used in the sensor are particularly suited for low cost, large volume manufacture. It is also desirable that the condition responsive element 12 be operable over wide temperature ranges and that the performance characteristics of the transducer be relatively insensitive to such changes in temperature to permit more precise matching between the transducer and signal-conditioning means even where the sensor 10 is used in automotive applications an the like where severe ranges of temperature and other environmental conditions are encountered. As the transducer 12 is more fully described in the commonly-owned, copending application Ser. No. 859,566 filed of even date herewith for "Pressure Sensor with Improved Capacitive Pressure Transducer", the disclosure of which is incorporated herein by this reference, and as other conventional condition-responsive elements can also be used in the sensor 10, the transducer 12 is not further described herein and it will be understood that any condition-responsive pressure or position transducer or the like adapted to provide an initial electrical signal in response to a change in a condition being monitored is used in the sensor 10 within the scope of this invention.

In accordance with this invention, the transducer 12 and signal-conditioning circuit 43 are mounted on a common support or housing as illustrated and calibration means as are more fully described below are also mounted on the common support for calibrating the transducer and signal-conditioning means relative to each other after they have been assembled on the common support. Preferably the calibration means are selected to be electrically actuatable within the integrated circuit to adapt the sensor 10 for low cost, high volume manufacture and automated calibration to adapt the sensor for wide application. Preferably for example, where the transducer as mounted on the support is adapted to provide initial electrical signals within a first predetermined range in response to occurrence of selected conditions in a zone to be monitored, and where the signal-conditioning means as mounted on the support is adapted to provide selected electrical output signals within a second predetermined range for performing selected control functions, the calibration means provided within the integrated circuit is adapted to be adjustable over a sufficient range for calibrating the transducer and signal-conditioning means relative to each other to provide said selected output signals in response to the occurrence of any of said selected conditions to be monitored.

Figure 3:
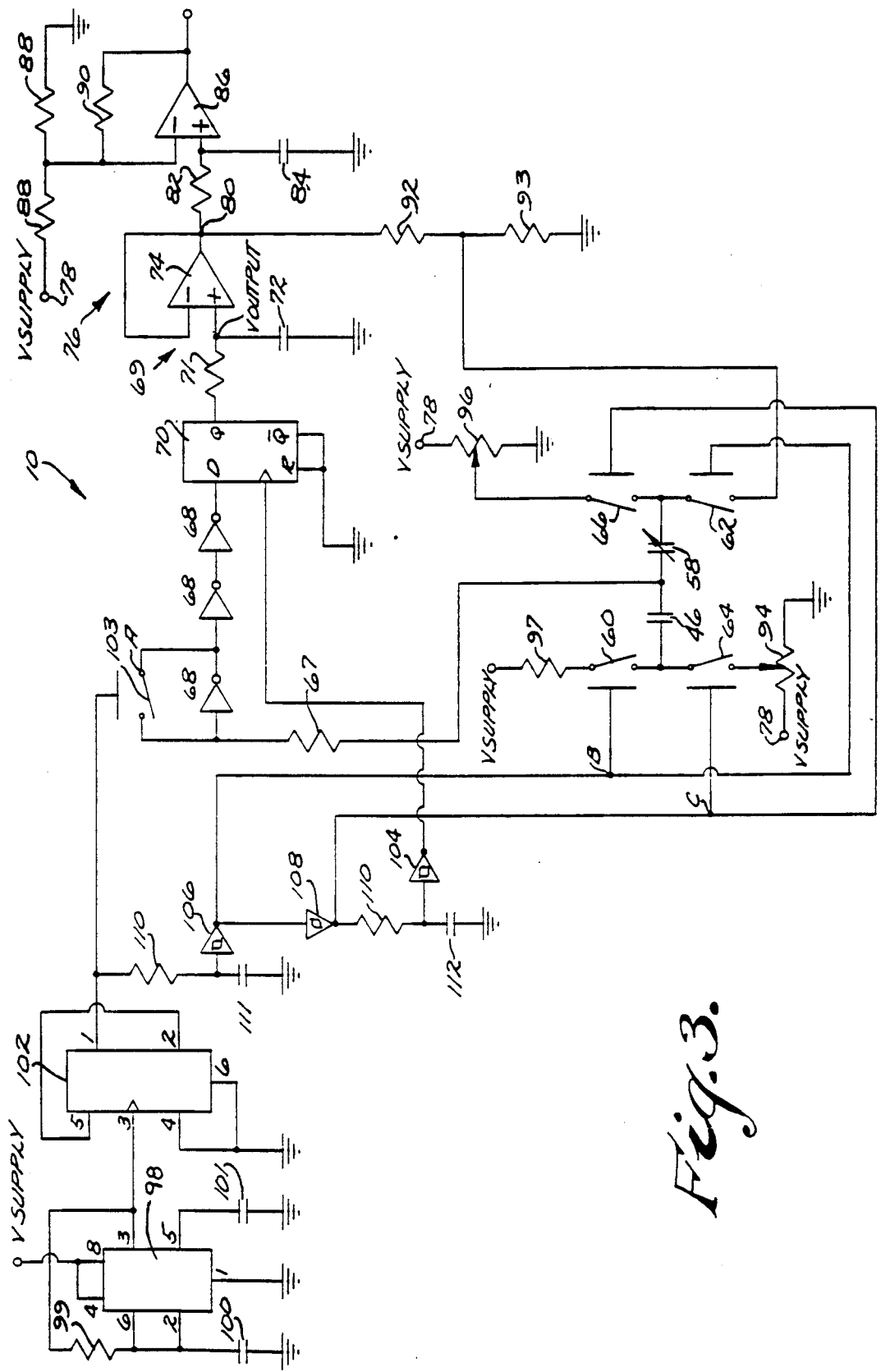
FIG. 3 is a schematic view of an analog signal conditioning circuit embodied in one preferred embodiment of the sensor of this invention.

In accordance with this invention, the signal-conditioning means 43 preferably comprises a capacitance-to-voltage converter circuit such as is schematically illustrated in FIG. 3. Preferably for example, the variable capacitor of the capacitive pressure transducer 12 is connected in a charge-locked loop relation with the reference capacitor 46 for forming a common node 58 between the capacitors. A quad array of switches 60, 62, 64, 66 is then arranged as shown so that closing of pairs of the switches 60, 62, and 64, 66 in alternate sequence is adapted to apply selected alternate voltages of opposite polarity to the capacitors and node 58 for establishing a selected voltage level at the common node. The common node is connected through a limiting resistor 67, three linear inverter stages 68, and a flip-flop 70 to a current source-sink-integrate network constituted by the limiting resistor 71, integrating capacitor 72, and the operational amplifier 74 for providing output voltage signals at the output means 76 which are inversely proportional to the value of the transducer capacitance 58 and ratiometric with supply voltage as applied at input terminal means 78. Preferably the output means comprises an output node 80 and an additional amplification stage constituted by the filter resistor 82, filter capacitor 84, operational amplifier 86, voltage divider resistors 88, and gain resistor 90. The output node 80 is connected through the voltage divider resistors 92, 93 to provide output voltage feedback to one switch 62 of the quad array and two of the other switches 64, 66 in the array are connected to the supply voltage through the calibration means constituted by the potentiometers 94 and 96 respectively. The fourth switch 60 is connected to the supply voltage through a limiting resistor 97 as shown. A clock means 98 associated with timing resistor 99 and timing capacitors 100, 101 in conventional manner is connected via a second flip-flop 102 to a switch 103 arranged to shunt one inverter stage 68. That flip-flop 102 is further connected via Schmidt-triggered inverters 104, 106, 108 arranged with appropriate delay resistors 110 and delay capacitors 111, 112, for operating the first flip-flop 70 and the alternate pairs of switches 60, 62, and 64, 66 respectively in a predetermined sequence to cycle the transducer capacitor 12 and the reference capacitor 46 at a predetermined frequency between for example, the potentiometer voltage 94 and supply voltage of the circuit at one polarity and between the potentiometer voltage 96 and the portion of the output voltage at the node between resistors 93 and 93 at opposite polarity respectively. As will be understood, the potentiometers 94, 96 are adjustable for adjusting the voltage supplied to the transducer and reference capacitors in calibrating the sensor 10. That is, calibrated output voltage varies with transducer capacitance in accordance with the following relationship:

$$(Vccfb - Voutfo) cx = (Vcc - fx Vcc) cb$$

where:
Vcc = supply voltage (78)
Vout = output voltage (80)
cx = transducer capacitance (12)
cb = reference capacitance (46)
fb = fraction of supply voltage at potentiometer (96)
fo = fraction of output voltage at voltage divider (92,93)
fv = fraction of supply voltage at potentiometer (94)

In one embodiment, the potentiometers are conventional screw-adjustable type and are mounted on the sensor to be adjustable after the sensor is assembled on the sensor support means as is diagrammatically illustrated in FIG. 2 by the resistor adjusting opening 114. Alternately, in preferred embodiments of the invention, the calibrating means are electrically actuatable to effect calibration after assembly on the sensor support as described further below.

In the preferred embodiment of the invention as described with reference to FIG. 3, the following conventional components are used in the signal-conditioning means as above described:

| REFERENCE | COMPONENT |
| --- | --- |
| Timer 98 | TLC 555 |
| Flip-flop | CD 4013 |
| Linear Inverter 68 | CD 4069 |
| Schmidt triggered Inverter 104, 106, 108 | CD 40106 |
| Operational Amplifier 74, 76 | 7621 BCN |
| Switch 60, 62, 64, 66 | CD 4066 |
| Switch 103 | CD 4016 |
| Reference capacitor 46 | 27 picofarads |
| Transducer capacitor 12 | 30 to 60 picofarads |
| Filter capacitor 72, 84, 101 | .01 microfarads |
| Delay capacitor 112 | .001 microfarads |
| Delay capacitor 111 | 200 picofarads |
| Timing capacitor 100 | 500 picofarads |
| Voltage Divider Resistors 88 | 47K ohms |
| Limiting Resistors 71, 82 | 1 megohm |
| Voltage Divider Resistors 92 | 3.3K ohms |
| Voltage Divider Resistors 93 | 1K ohms |
| Limiting Resistor 67 | 1K ohm |
| Limiting Resistor 97 | 750 ohms |
| Delay Resistor 110 | 4.7K ohms |
| Timing Resistor 99 | 22K ohms |
| Potentiometer 94, 96 | 0 to 10K ohms |
| Gain Resistor 90 | 22K ohms |

All components identified by Catalog Number are manufactured by Texas Instruments Incorporated or equivalent.

Where the supply voltage is typically in the range from about 4 to 6 volts and the clock means 98 is operating at a frequency of 33 kilohertz, the inverter switch 103, the alternate pairs of switches 60, 62 and 64, and 66, and the flip-flop 70 are sequenced at 30 microsecond intervals d1, with the switch pairs and the flip-flop being operated with one microsecond d2 and six microsecond d3 delays respectively after the inverter switch operation as indicated in the wave diagram of FIG. 4.

In that arrangement, where the pressure 30 being monitored is stable and at the lower level of the pressure range to be monitored, the transducer capacitor 12 and reference capacitor 46, and thus common node 58 are cycled between the potentiometer voltage 94 and supply voltage of the circuit at one polarity and between the potentiometer voltage 96 and the fraction of the output voltage at the node between resistors 92 and 93 at opposite polarity, that output voltage as fed back to the switch 62 being modified by the voltage divider means 92, 93 as may be desired. A voltage level is therefore established at the common node 58 to drive the current source-sink-integrate network 69 constituted by the resistor 71, capacitor 72, and operational amplifier 74 to establish an analog output voltage level at the node 80 corresponding to the ratio between the reference and transducer capacitors. The potentiometer 94 is then adjustable (with the pressure 30 at its lower level) to provide bias calibration for the sensor such that the output voltage is set at 0 for example at the lower level of the desired output voltage range at the node 80. Then with the pressure 30 at the upper level of its desired range likely to be encountered in the zone to be monitored, the potentiometer 96 is adjusted to provide primarily gain calibration of the sensor to set the output voltage at node 80 to the upper side of its desired output voltage range. In that arrangement, where the fluid pressure 30 is in stable condition at any point within the pressure range to be monitored, the output voltage at node 80 is inversely proportional to the capacitance in the transducer capacitor 12 and the transducer capacitance is inversely proportional to the gap between the transducer capacitor plates. Thus, if the pressure 30 is increased for increasing the transducer capacitance, the cycling of the transducer and reference capacitors as above described establishes a differential voltage at the common node 58 to drive the current source-sink-integrate network and increase the output voltage at node 80, that output voltage being then fed back via the switch 62 to null the described differential voltage at the common node and maintain the output voltage inversely proportional to the now higher transducer capacitance. As will be under stood, the reference and transducer capacitors can be reversed in the described capacitance-to-voltage converter circuit so that the circuit is also adapted to serve as direct rather than inverse capacitance detector as will be understood. Although in some embodiments of the sensor of this invention, the signal-conditioning means can comprise conventional phase-locked amplifier circuits or synchronous modulated-demodulated circuits for converting small transducer capacitances to output voltages ratiometeric with respect to circuit supply voltages in conventional manner, the charged-locked loop capacitance-to-voltage converter circuit as above-described is found to operate significantly faster in terms of capacitance comparisions in pressure and to provide significantly greater accuracy for use over a wide temperature range by avoiding errors due to junction leakage currents and minimizing offset voltage errors such as are experienced with circuits previously known.

In another preferred embodiment of the sensor 210 of this invention as shown in FIG. 5, wherein components comparable to those shown in FIG. 3 are identified with corresponding reference numerals, the signal-conditioning means are particularly adapted to be incorporated in an integrated circuit diagrammatically indicated by broken lines 243 in FIG. 5 and to be implemented in bipolar or CMOS technology or the like. In this embodiment for example, the transducer capacitor 212 and reference capacitor 246 are arranged in charge-locked loop relation with a common node 258 and with an array of switches 260, 262, 264, 266 for cycling the transducer capacitor, reference capacitor, and common node between voltages as previously described with references to FIG. 3 for driving a current source-sink network 269, and integrating capacitor 272, and voltage follower 274, the resistor 267, linear inverters 268, and flip-flop 270, the described circuit having corresponding clock means (not shown) for operating the inverter switch 303, the flip-flop 270, and the switches 260, 262, 264, 266 in predetermined sequence at a predetermined frequency as previously described. Preferably where a guard or shield is used in the transducer as shown in the commonly owned patent application filed of even date herewith as noted above, the guard or shield as diagrammatically illustrated at 263 in FIG. 5 are electrically connected to a voltage source diagrammatically illustrated at 269 in FIG. 5 to be held at the typical voltage level of the common node 258 for substantially shielding the node area of the transducer.

In this embodiment of the invention, the calibration means are integrally incorporated on-chip in the integrated circuit 243 to be mounted on a common support in the sensor 210 with the circuit and with the transducer 212 to be actuated by electrical input through the integrated circuit to calibrate the circuit 243 relative to the transducer after assembly on the common support. Preferably for example, the calibration means comprises a shift register 316 receiving clock input and calibrating data at 318, 320 respectively in conventional manner for cooperating with memory means 322 in conventional manner such that calibration data for the sensor 210 is adapted to be entered into the memory via the shift register from sensor testing apparatus (not shown) while the pressure in the zone to be monitored is set first as indicated at 30 at the desired low level and then at the desired high level of the monitoring range as previously described. That is, the sensor is first subjected to calibration testing at each of the high and low pressure levels and additional calibration data is inserted into the register as necessary to adjust the sensor output voltages within the desired output voltage range to provide bias and gain calibration for the sensor as will be understood. Preferably for example, the shift register comprises a conventional series-in, parallel-out register adapted to receive and provide a twenty-bit calibration word to the memory. A pair of digital-to-analog converters 324, 326 of conventional type are each arranged to receive one-half the data or a ten-bit word from the memory for inserting appropriate bias and gain calibration respectively into the signal-conditioning circuit 243. Preferably the memory means 322 comprises nonvolatile fusible metal link memory means or the like and includes permanent programming means as indicated diagrammatically at 328 in FIG. 5 for fixing the calibrating data in the memory after sensor calibration. Where the circuit is implemented in either bipolar polar or CMOS technology or the like, a very small change in transducer capacitance in the range of 10% to 50% as typical is adapted to be precisely reflected in a full range of output voltage for the sensor. Typically the digital-to-analog converters incorporate, or cooperate with, a conventional resistor array or the like for inserting bias and gain calibration resistances in the signal-conditioning circuit to effect calibration in a manner similar to the FIG. 3 embodiment of the invention. In this way, the D/A convertors are adapted to provide convenient automatic serial programming during sensor calibration for providing low cost sensors adapted to display high precision condition sensing which are easily adapted for serving in many different sensor applications. It will be understood that the signal-conditioning means of the invention is also adapted to provide analog output signals or digital output within the scope of this invention. Similarly although fusible metal link memory means are shown to be incorporated in the calibration means of the circuit, EPROM means or other comparable memory means can also be used within the scope of the invention.

In another alternate embodiment of the sensor 410 of this invention, as is partially illustrated in FIG. 6, wherein com-parable reference numerals are also used, sensor calibration is partially achieved by adjustment of a variable capacitor as an alternate calibration means. In this embodiment, the variable transducer capacitor 412 is arranged in a charged-locked loop relation with a reference capacitor 446 which is also variable, the transducer and first reference capacitor each being connected to a common node 458. An array of switches 460, 462, 464, 466 and voltage divider means 492,493 are arranged in an integrated circuit 443 in a manner similar to the switch array and feedback in embodiments of the invention previously described to cycle the capacitors are previously described. As will be understood the reference capacitor 446 is adjustable in any conventional manner for achieving some calibration of the circuit.

If desired, calibrating adjustment of the variable reference and transducer capacitors is further accomplished by use of electrically actuable means in a manner corresponding to FIG. 5 as is diagrammatically indicated at 544 and 546 in FIG. 6 in accordance with this invention. That is, a shift register receives and provides a calibration word to a memory comprising nonvolatile fusible metal link memory means as previously described and permanent programming means fix the calibration data in the memory means. Digital-to-analog converter means respond to the calibration data in the memory to cooperate with a conventional capacitor array (not shown) in the integrated circuit 443 for inserting bias and gain calibration capacitances into the circuit of FIG. 6 as above described. It will be understood that full calibration of the sensor of this invention by means of adjusting variable capacitors is within the scope of the present invention.

In another alternate embodiment of the sensor of this invention, the sensor circuits substantially correspond to the sensor 10 previously described with reference to FIG. 3. However, in this embodiment of the invention 610 as shown in FIG. 7, the bias and gain calibration means incorporated in the circuit each comprise an electrically settable potentiometer means as diagrammatically illustrated at 694 in FIG. 8.

That is, a potentiometer 694 is substituted in the signal-conditioning circuit of sensor 610 to correspond to each of the potentiometers 94, 96 described with reference to FIG. 3. In the potentiometer 694, an electrically conductive metal grid 696 is formed on an insulating base 698 of silicon or the like by deposition of a metal ink or in other conventional manner so that the grid has a plurality of connector bars 700 arranged in a row connected at one end to a common bus 702. Each connector bar has a portion 700.1 of relatively small cross section and a thick film resistor 704 is deposited over the bars to be electrically connected to each bar between the smaller bar portion 700.1 and an opposite end 700.2 of the bar. One end of the resistor is connected to the sensor supply voltage as is diagrammatically indicated at 706 in FIG. 7 while the opposite end of bar 702 is connected to ground via a pull down resistor 705. A wiper arm 708, which can be part of the potentiometer 694 or part of a sensor testing apparatus within the scope of this invention, is moved slideably along the section 704 to make electrical engagement with the opposite end 700.2 of the connector bars in selected sequence as indicated by the arrow 710. Use of the potentiometer to introduce bias or gain calibration within the circuit of the sensor 610 is then tested as above described with reference to FIG. 3. If the resistance interposed in the sensor circuit by the potentiometer 694 in this manner is insufficient for fully calibrating the sensor while the wiper arm is electrically engaged with a specific connector bar, a high intensity electrical pulse is provided to that bar from a calibrating power source 711 via the wiper arm and switch means 712 diagrammatically shown in FIG. 7 for overloading the bar to evaporate the small cross-section portion 700.1 of the bar as indicated at 700.1a in FIG. 7. The wiper arm is then moved to sequentially engage the next connector bar in the sequence as sown in FIG. 7 to continue with the calibration process. As will be understood, the provision of the noted calibrating pulse is adapted to be automated in any conventional manner for calibrating the sensor 610 at low cost. It should be understood that although particular embodiments of this 10 invention have been described by way of illustrating the invention, other embodiments of the invention are also possible. For example, although the capacitive pressure transducer is illustrated as having a movable plate with an air dielectric, a comparable transducer having fixed plates and a movable dielectric can also be used within the scope of this invention. This invention includes all modifications and equivalents of the disclosed embodiments following within the scope of the appended claims.

We claim:

1. A low-cost high-precision sensor comprising a separate condition-responsive means including a condition-responsive element movable in response to occurrence of selected conditions in a zone to be monitored for providing initial electrical signals, a separate integrated circuit signal-conditioning means for conditioning the initial electrical signals to provide electrical output signals for performing control functions, and a common support means mounting the separate condition-responsive means and signal-conditioning means together and means mounted on the support for calibrating the sensor, the condition-responsive means being mounted on a support for providing initial electrical signals in response to the occurrence of selected conditions in the zone to be monitored, the signal-conditioning means being mounted on the support to respond to said initial electrical signals for providing electrical output signals from the sensor, and the calibration means being mounted on the support and electrically actuable after mounting on the common support to adjust the conditioning-responsive means and signal-conditioning means on the common support relative to each other after mounting on the support for calibrating the sensor to provide said output signals to perform said control functions in precise response to occurrence of said selected conditions.

* * * * *